(12) United States Patent  
Eek et al.

(10) Patent No.: US 7,173,210 B2
(45) Date of Patent: Feb. 6, 2007

(54) SPOT WELDING GUN AND A GUN ACCESSORY

(75) Inventors: Magnus Eek, Köping (SE); Sivert Stenkvist, Torshälla (SE)

(73) Assignee: Car-O-Liner AB, Kungsor (SE)

( * ) Notice: Subject to any disclaimer, the term of this patent is extended or adjusted under 35 U.S.C. 154(b) by 0 days.

(21) Appl. No.: 11/176,197

(22) Filed: Jul. 8, 2005

(65) Prior Publication Data

US 2006/0006152 A1    Jan. 12, 2006

(30) Foreign Application Priority Data

Jul. 9, 2004    (SE)    .................................... 0401825

(51) Int. Cl.
*B23K 11/11* (2006.01)
(52) U.S. Cl. ...................... 219/86.25; 219/90
(58) Field of Classification Search ............. 219/86.25, 219/86.21, 90
See application file for complete search history.

(56) References Cited

U.S. PATENT DOCUMENTS 2,349,835 A    5/1944    Strickland 6,706,990 B1    3/2004    Olsson

FOREIGN PATENT DOCUMENTS

EP    1 375 046 A1    1/2004
WO    WO 00/15379    3/2000

*Primary Examiner*—Len Tran
(74) *Attorney, Agent, or Firm*—Harness, Dickey & Pierce, P.L.C.

(57) ABSTRACT

A spot welding rod for resistance welding of object comprises a rod which is moveable axially, and two electrode arms provided with electrodes, wherein the electrodes face towards each other and the welding gun is adapted to press together objects to be welded located between the electrodes by axial movement of the rod, and to allow welding current to flow between the electrodes. The rod axis extends in a direction which is generally perpendicular to the directions of the electrodes and at least one of the electrode arms is pivotally mounted. The welding gun includes structural elements which are connected operatively to the at least one pivotally mounted electrode arm and the rod. The structural elements are disposed between the point at which the one of the electrode arms is pivotally mounted and the electrodes and mutually engage one another and move translatively relative to each other and therewith force at least one of the electrodes towards the other electrode through the medium of a wedging action as the rod is moved axially.

12 Claims, 5 Drawing Sheets

SPOT WELDING GUN AND A GUN ACCESSORY

This U.S. non-provisional application claims benefit of priority under 35 U.S.C. § 119 of Swedish Patent Application No. 0401825-5, filed on Jul. 9, 2004, the entire contents of which are incorporated herein by reference.

TECHNICAL FIELD

The present invention relates to a spot welding gun and to a spot welding gun accessory.

RELATED ART

Resistance welding or spot welding is a technique in which two or more objects are joined together at one or several points, typically with the aid of a spot welding gun.

Resistance welding of this kind can be used in manufacturing processes or in repair work, particularly with regard to car chasses. Resistance welding is a quick and an effective method which provides stronger weld joints with fewer weld points than is achieved with a MIG-welding process or similar process. Resistance welding with the aid of a welding gun is also environmentally friendly, for instance significantly reduces fume emission. The method also results in a low development of heat in the metal around the welding point, meaning that the resistance to corrosion of galvanized or zincified metal will be retained and thermal stresses in the construction minimized. Those so-called welding parameters that can be varied in the welding process include electrode pressure, amperage of the welding current and duration of the current, cooling effect, cooling time and so-called stay time or residence time.

There are essentially two different types of welding guns, X-guns and C-guns.

The X-guns have a pneumatic cylinder with which the electrode is actuated via a lever. The electrode pressure is thus dependant on the length of the lever arm which, in turn, affects other welding parameters. An example of X-guns is shown in U.S. Pat. No. 2,349,835.

The pneumatic cylinder of C-guns influences the electrode directly. The electrode pressure remains constant, regardless of the design of the lever arm. An example of C-guns is shown in the international patent publication No. WO 00/15379.

SUMMARY OF THE INVENTION

One problem encountered with welding guns of the aforesaid kind is that it is difficult to pass edges or other obstacles presented by the objects to be welded, when positioning the spot welding gun in relation to the objects. It can also be difficult to reach welding objects that are located within bodies, such as within car chasses for instance.

Another problem encountered with welding guns according to the earlier standpoint of techniques is that these known guns do not generate a clamping force or sufficient application linearly. These guns also have a non-flexible construction which makes it difficult to switch accessories (tools) for welding guns or parts thereof with which the clamping force of the guns can be strengthened for instance.

An object of the present invention is to provide a spot welding gun with which one or more of the problems arising with a spot welding gun according to known technology is/are avoided.

Accordingly, one object of the present invention is to provide a spot welding gun which, via an uncomplicated procedure, enables or facilitates passage of the guns passed obstacles when positioning the guns in relation to objects to be welded and when removing the guns therefrom.

Another object of the invention is to provide a spot welding gun of the aforesaid kind which is compact and reliable.

Still another object of the present invention is to provide a spot welding gun accessory wherewith the welding gun and the accessory when fitted thereto will satisfy at least one of the above objects.

These and other objects are achieved in accordance with the present invention by means of welding guns and welding gun accessories in accordance with the accompanying claims.

A spot welding gun for resistant welding of objects includes an axially moveable rod and two electrode-carrying arms, wherewith the electrodes face one another and the gun is adapted to press together the objects to be welded between the electrodes by moving the rod axially, and to permit welding current to flow between the electrodes. The rod extends axially generally at right angles to the directions of the electrodes, wherein at least one of the electrode-carrying arms is pivotally mounted, and wherein structural elements are operatively connected to at least the pivotally mounted arm and to the rod. The structural elements are disposed between the point at which one of the electrode arms is pivotally mounted and the electrodes and are in engagement with each other and move translatively relative to one another and therewith force at least one electrode to move towards the other electrode in response to axial movement of the rod. A change in the angle of force of about 90° is obtained by the wedging effect or by utilizing the principle of sloping planes.

By arranging the structural elements between the points of attachment of the electrode arms and the electrodes the electrode arm can be attached at its innermost end and therewith enable the full length of the arm to be used for pivotal action. This enables the arm to pivot about a larger radius, wherewith the clamping force will be directed more linearly i.e. the directions of the forces will lie closer to the normal to the surfaces of the objects to be welded. The elements are placed so that at least one of the elements can be replaced with another element that has a different angle of inclination so as to change the clamping force or the electrode distance and to enable a complete accessory (tool) to be replaced with another accessory that has a different angle of inclination with regard to its wedging effect, a different electrode distance or a different arm length. Placement of these elements is achieved with a highly flexible construction.

These co-acting elements have a number of different designs. One of the elements may comprise a slot, a groove, a wheel or a roller and another of the elements may comprise a projection, a pin or like device intended to run in the slot or the groove, or a surface adapted to guide the roller or the wheel.

According to one embodiment, also the other electrode arm is pivotally mounted and operatively connected to the elements so that the other electrode arm will be forced to move towards the first electrode arm when the rod is moved axially.

This results in clamping forces that are directed more towards each other, meaning that the directions of the forces will lie closer to the normal of the surfaces of the objects to be welded than would have been the case with solely one moveable electrode arm.

The inventive spot welding gun is very compact and very flexible. It can be moved far into a car chassis and other not readily accessed structures and is able to reach objects that were previously impossible to reach with spot welding guns of the earlier known kind.

BRIEF DESCRIPTION OF THE DRAWINGS

The invention will now be described in more detail with reference to FIGS. 1–6, these figures solely illustrating the invention and do not in any way limit the scope of the invention.

DETAILED DESCRIPTION OF EMBODIMENTS

Figure 1:
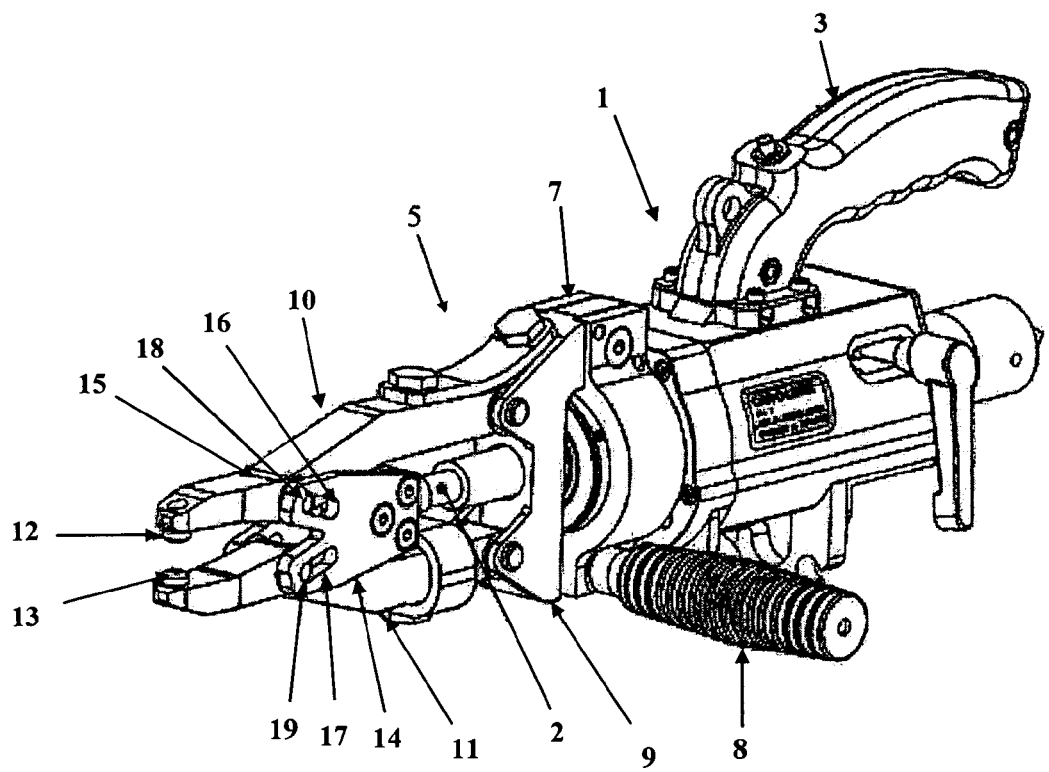
FIGS. 1–2 are diagrammatic views of a spot welding gun according to an embodiment of the present invention.
Figure 2:
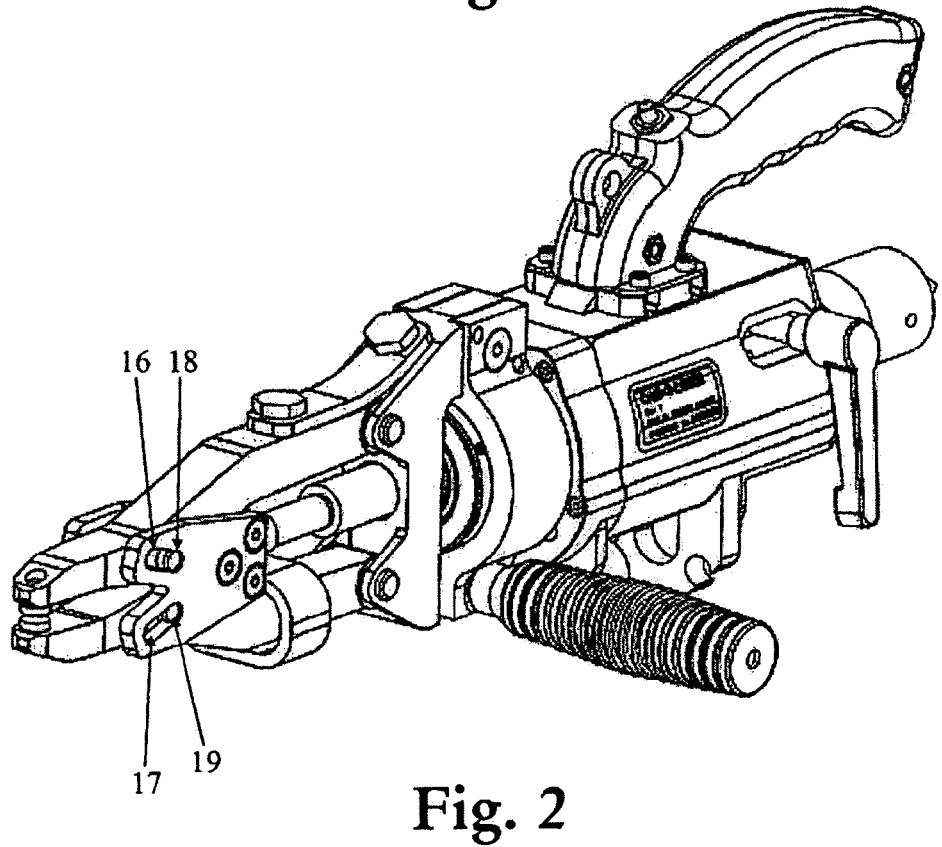

FIGS. 1–2 are diagrammatic illustrations of a spot welding gun according to an embodiment of the present invention. The spot welding gun comprises a housing 1 that includes a pneumatic cylinder in which there is provided a piston or a pressure rod that can be moved axially through a limited path, a handle 3, and an accessory 5 which can be releasably fitted to the housing 1. FIG. 1 illustrates the gun with its pneumatically driven piston in a retracted position, while FIG. 2 shows the gun with the piston in a forwardly projected position. The gun also includes a connection for supplying compressed air to the pneumatic cylinder and electric connections for the electrodes and also for the control electronics.

The accessory 5 includes a ring-shaped part 7 which can be releasably fastened to the housing 1, a handle 8, a rod 2 which is operatively connectable, for instance mechanically securable, to the piston of the welding gun, and an attachment 9 for electrode arms that are fixedly mounted to the ring-shaped part 7.

Two electrode arms 10, 11 are pivotally affixed to the attachment 9 and each one is provided with a respective electrode 12, 13, which is preferably fixedly mounted to its respective arm. The two electrodes 12, 13 face towards each other and have rounded and possibly slightly flattened electrode tips. It will be noted that the directions of the electrodes are generally perpendicular to the axial direction of the rod 2 and therewith also perpendicular to the axial direction of the pneumatic cylinder as opposed, for instance, to a C-gun.

Two plates 14, 15 are fixedly mounted to the front end of the rod 2, wherein each of the plates includes oblique slots or grooves 16, 17. Extending from respective electrode arms 10, 11 are two projections, for example pins, spikes or like devices 18, 19 which engage with the slots 16, 17 in the plates 14, 15, this engagement forcing the electrodes 12, 13 towards each other in response to axial movement of the rod 2. The change in the force direction from the axial direction of the piston and the rod 2 to the perpendicular direction from electrode to electrode is achieved by virtue of a wedging effect or by using an inclined plane. The oblique slots 16, 17 can be likened to wedges or to inclined planes and the axial forward drive of the rod 2 will force the electrode arms 10, 11 to move up these wedges or inclined planes as the projections or pins 18, 19 move or slide translatively in the slots 16, 17.

Although the welding gun is shown obliquely from one side in FIG. 1 and although only one plate 14 with its oblique slots 16, 17 and only the projections 18, 19 on one electrode arm 10 can be clearly seen it will be understood that the other plate 15 has corresponding oblique slots 16, 17 and that the other electrode arm 11 is provided with corresponding projections.

The plates 14, 15 can be mutually connected at their rear end portions by means of a spacing element or the like and may also provide a contact surface, a support or an attachment for the front end of the rod 2.

When using the welding gun from the starting position shown in FIG. 1, the welding gun is set so that the electrodes 12, 13 will be located on a respective side of the objects to be welded together. The rod 2 is driven axially forwards by means of the pneumatic piston-cylinder device of the welding gun, therewith forcing the electrodes 12, 13 towards one another. The objects to be welded are pressed together between the electrodes 12, 13 as a result of the movement of rod 2 and the resultant wedging effect, and welding current is caused to flow between the electrodes so as to form a spot welding joint. The rod 2 is then retracted axially by means of the pneumatic piston-cylinder device of the welding gun, such as to move the electrodes apart so as to enable or simplify removal of the welding gun.

FIG. 1 shows the welding gun in an open or retracted state (the projections 18, 19 on the electrode arms are located furthest forward in the slots 16, 17) whereas FIG. 2 shows the welding gun in a closed or forwardly displaced position (the projections 18, 19 on the electrode arms are located furthest to the rear in the slots 16, 17).

It will be noted that when the electrode arms 10, 11 are spring-biassed so that they are able to return to the starting position shown in FIG. 1 without being aided by the rod 2, the plates 14, 15 need not be fixedly mounted to the front end of the rod 2 but need only be arranged so that they will be driven forwards by the rod 2 when the rod is driven forwards.

The inventive spot welding gun described above shall be constructed particularly to satisfy the various quality demands of car manufacturers, particularly in respect of the after-market. The welding gun must have sufficient clamping force, amperage and cooling ability to be able to manage occurring plate thicknesses and anti-rust coatings present on the chassis. Welding time, cooling time and stay time shall be controlled precisely and reliably.

The accessory is very compact and can be moved far into car chassis and the like. The magnitude of the clamping force obtained between the electrodes is dependent (i) on the distance between the electrodes 12, 13 and the attachment of the arms 10, 11, (ii) the distance between the slots 16, 17 and the electrodes 12, 13, and (iii) the angle of the slots 16, 17.

Because two moveable arms move towards the objects to be welded the clamping forces obtained are more counterdirectional with respect to one another, meaning that the directions of the forces will lie closer to the surfaces of the objects to be welded than would have been the case when only one electrode arm is moveable.

It will be noted that the accessory 5 may be pivotal/rotatable radially around the housing 1. The ring-shaped part 7 will preferably include a slot or an aperture that will enable it to be locked firmly to the housing 1 with the aid of a single screw. In the case of the illustrated embodiment, the screw is integral with the handle 8, wherewith the accessory 5 can be turned by (i) releasing the arm (the screw is loosened by turning the handle 8), (ii) rotating the accessory 5, and (iii) firmly locking the accessory 5 (by turning the handle 8). The accessory can, of course, also be dismantled and replaced with another accessory of appropriate design. For example, the length of the arms 10, 11 and the angle of the slots 16, 17, and therewith the distance between the electrodes 12, 13 in the retracted position, can vary from device to device.

A cylinder-mounted rear electrode and a C-arm described in the aforesaid WO 00/15379 can also be used together with the spot welding gun (substituted for the above mentioned accessory) in the case of certain applications. The contents of this earlier publication is therefore included in the present application document by virtue of the reference to the publication.

This provides a highly flexible spot welding gun with which accessories are chosen in accordance with the application in which they are used, among other things the electrode arm design.

Accessories other than those typically used with welding guns can be fitted alternatively to the welding gun shown in figures 1–2. For instance there can be used a tool which is similar to the accessory 5 but which lacks electrodes and the electrical connections and which is modified so that the slots 16, 17 in the plates 14, 15 are angled in mutually opposite directions with respect to the axial direction of the rod 2 for loosening a joint and the like, such as a riveted joint. The tool may be designed so that the arms 10, 11 will be brought together when the rod 2 is in its rear position wherewith the arms are forced outwards away from each other when the rod 2 is driven forwards by means of the pneumatic piston-cylinder device of the spot welding gun. There is obtained in this case a force which is directed outwardly instead of the inwardly directed force obtained with a spot welding rod that includes the accessory 5 shown in FIGS. 1–2.

It is also proposed that the pneumatic cylinder of the spot welding gun can be replaced with some other type of driving mechanism, provided that the mechanism used is able to cause the rod 2 to move in a generally axial direction. For instance, an hydraulic cylinder can be used or a linear motor such as an electric motor.

It will also be understood that a spot welding gun of similar modus operandi can be obtained by angling the slots 16, 17 in mutually opposite directions with regard to the axial direction of the rod 2 and that the rod can be retracted instead and driven forwards.

Figure 3:
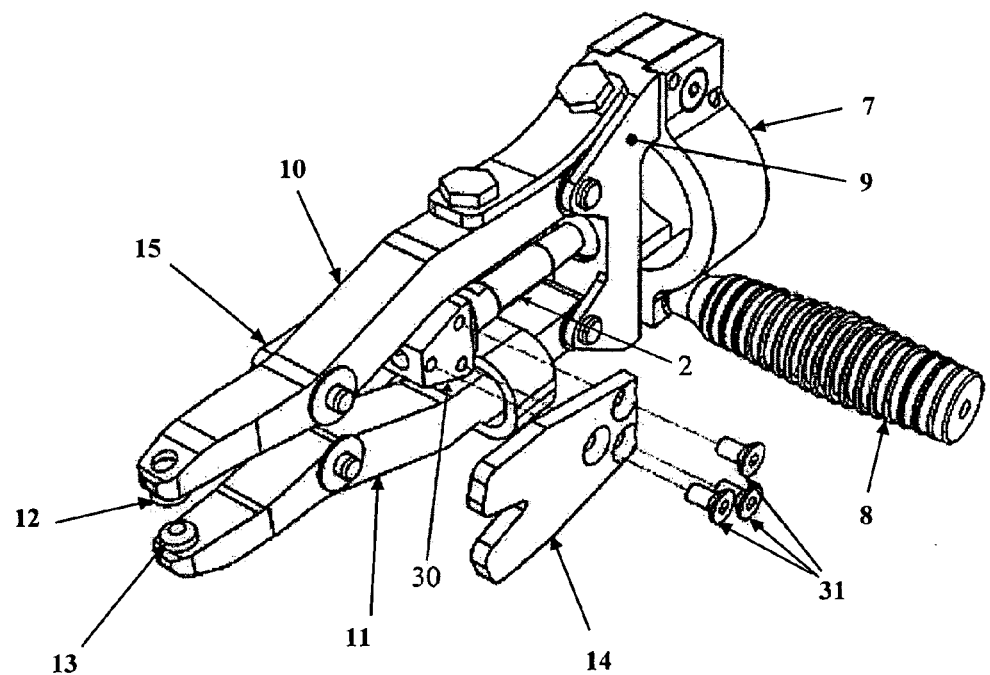
FIG. 3 is a diagrammatic illustration of an accessory for a spot welding gun according to a second embodiment of the present invention.

FIG. 3 is a diagrammatic illustration of an accessory for a spot welding gun according to a second embodiment of the present invention.

The accessory shown in FIG. 3 differs from the accessory shown in FIGS. 1–2, by virtue of the plates 14, 15 having a slightly different design. These plates include oblique non-penetrating grooves instead of through-penetrating slots. Each electrode arm 10, 11 has a hole in which a cylindrical shaft or pin is disposed such as to project out on both sides of respective electrode arms 10, 11. Each of the cylindrical shafts will conveniently be fastened in respective electrode arms with the aid of a bearing, such as a roller bearing or ball bearing, such as to engage a groove in each plate 14, 15, so as to obtain a similar translation movement and wedging effect as that obtained in the aforesaid manner when the rod 2 is driven forwards so as to move the electrodes towards one another and press the electrodes against the objects to be welded at the necessary force. When the shafts are mounted in a bearing, they are able to roll in the grooves with reduced friction as a result.

The electrode arms 10, 11 may be pivotally mounted in the electrode arm attachment 9 with the aid of bearings, so as to further reduce friction as the rod 2 is driven forwards.

The plates 14, 15 are affixed at their rear portions to a spacing element 30 which also forms a support or an attachment for the front end of the rod 2. The plates 14, 15 are screwed firmly to the spacing element 30 by means of screws 31.

One benefit afforded by the accessory shown in FIG. 3, is that the plates 14, 15 protect the grooves from dirt etc., which would otherwise lead to greater friction and therewith to malfunctioning. Friction can be further reduced, by mounting the articulating joints in bearings ?

FIGS. 4–10 are diagrammatic illustrations of spot welding guns according to other embodiments of the present invention.

Figure 4:
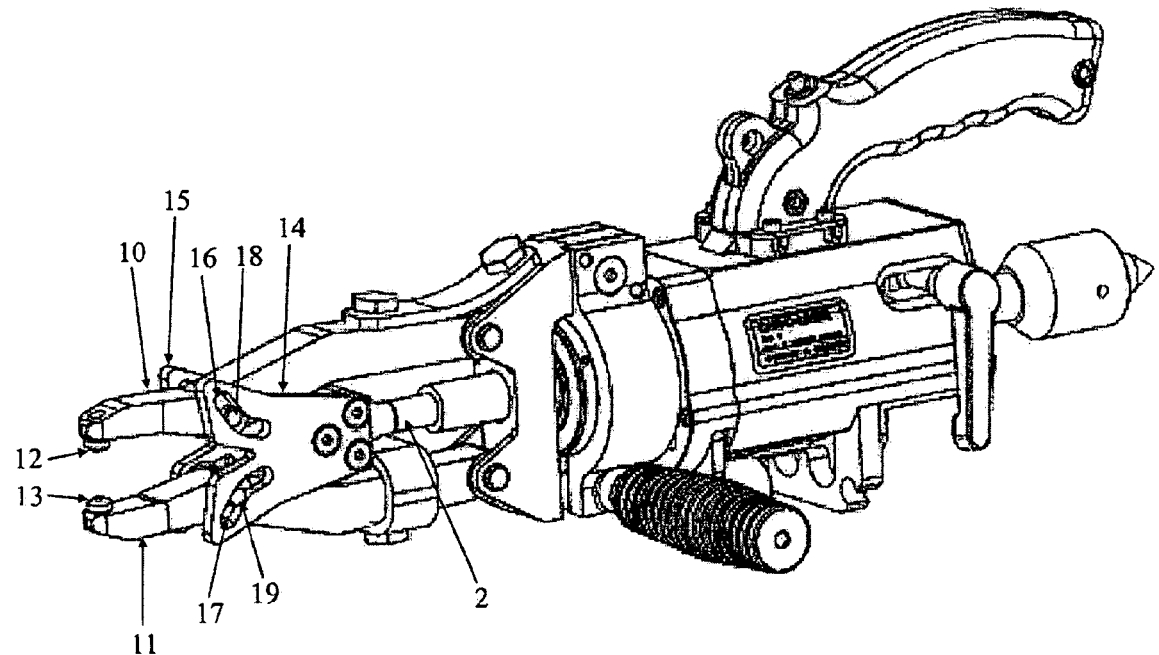
FIGS. 4–10 are diagrammatic illustrations of spot welding guns according to further embodiments of the present invention.

The spot welding gun illustrated in FIG. 4 differs from that illustrated in FIGS. 1–2 by virtue of the slots 16, 17 being curved instead of straight. Because the slots are more vertical at their front portions, the electrodes 12, 13 will approach each other more quickly initially as the rod 2 is driven forwards. Because the slots are more horizontal at their rear portions, a greater compressive force will be obtained in a later stage of this forward movement of the rod 2 since the wedging effect is then more pronounced, provided that the objects to be welded and located between the electrodes are sufficiently thin for the more horizontal part of the slots 16, 17 to be reached.

It will be understood that a spot welding gun according to the present invention may have curved slots of a shape other than that shown in FIG. 4.

Figure 5:
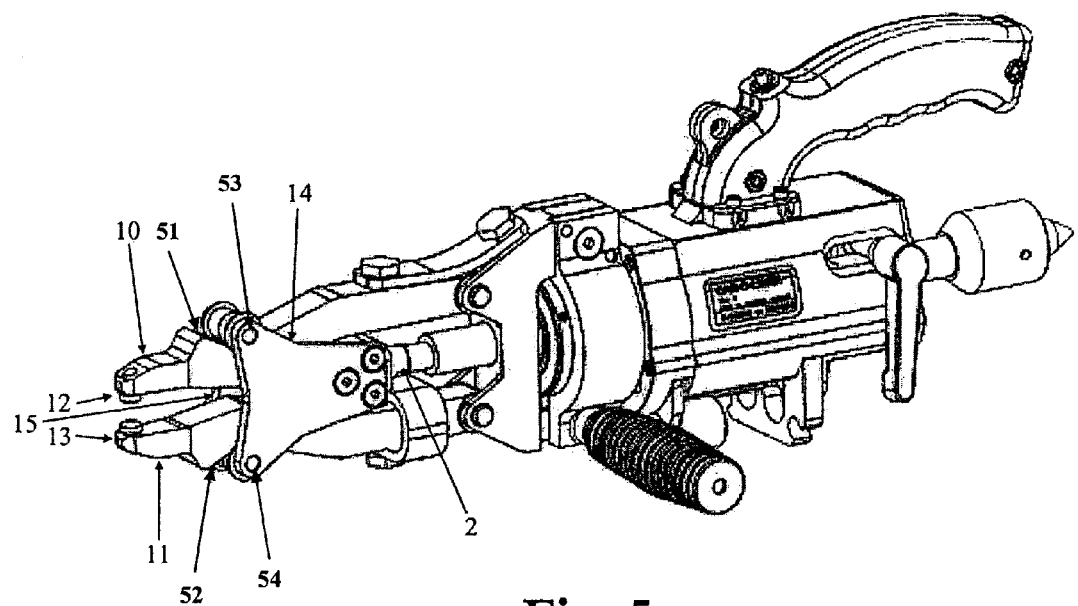

The spot welding gun illustrated in FIG. 5 differs from that illustrated in FIGS. 1–2 by virtue of the electrode arms 11, 12 and the plates 14, 15 having a different design. In this case, the electrode arms 11, 12 lack projections but, instead, engage surfaces 51, 52 which face away from each other and which are provided with an appropriate gradient. The plates 14, 15 are provided with rollers 53, 54 that are adapted to roll along the surfaces formed on the electrode arms 11, 12 so as to force the electrodes 12, 13 to move towards each other with a similar wedging effect as the rod 2 is driven forwards.

In this case, the inclined surfaces on the electrode arms constitute the components that create the wedging effect. As the rod 2 is driven forwards axially, the rollers are forced along the gradient of the surfaces and the horizontal movement of the rod 2 is converted into a force that acts on the electrodes in a perpendicular direction. A change in force direction (and in force amplification) is achieved classically by applying a force in the longitudinal direction of the "wedge" (which coincides with the axial direction of the rod 2 and therewith also the axial direction of the pneumatic cylinder), there being obtained a much greater force in the transverse direction (which coincides with the direction from one electrode to the other).

Figure 6:
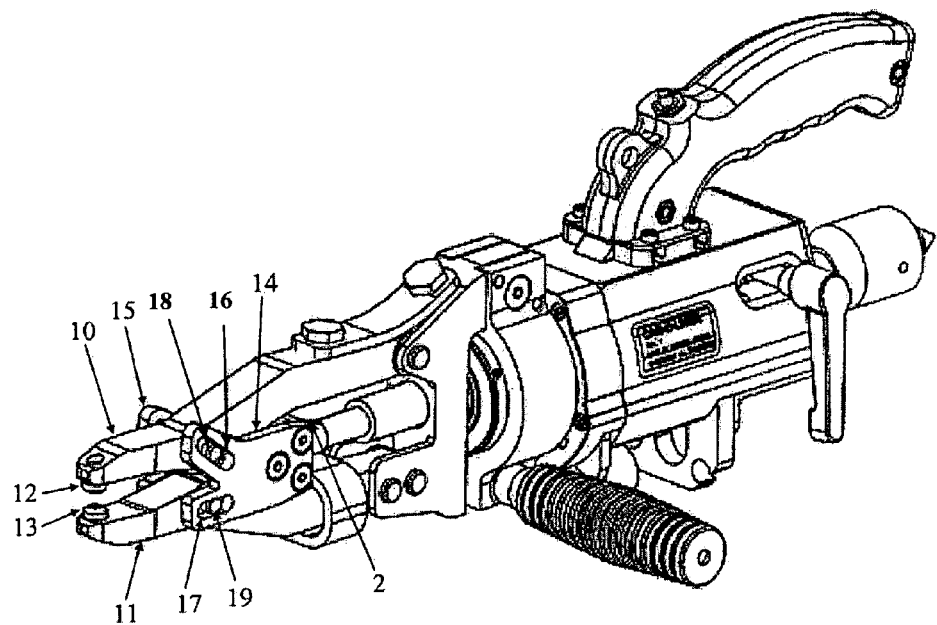
Figure 7:
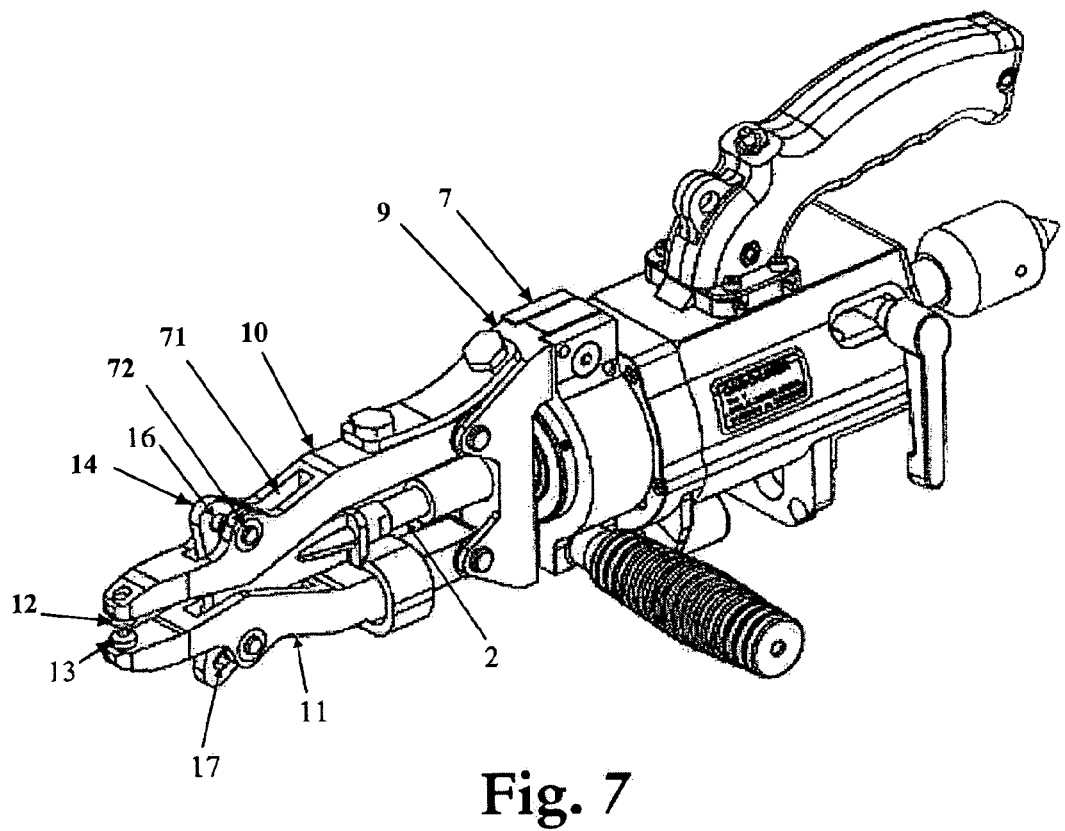

The spot welding gun shown in FIG. 6 differs from that shown in FIGS. 1–2 solely by virtue of the upper electrode arm 10 being pivotally mounted in the attachment 9 for the electrode arms, whereas the lower electrode arm 10 is fixedly mounted to the arm attachment 9. Both of the arms 10, 11 are provided with projections 18, 19 and the plates 14, 15 include upper oblique slots 16 and lower, generally horizontal slots 17 adapted to receive the projections or pins 18, 19. As the rod 2 is driven forwards, solely the upper electrode arm 10 and its electrode 12 will be subjected to a wedging effect, such as to force the electrode on the upper electrode arm to move towards the electrode 13 on the lower electrode arm 11. Thus, the electrodes 12, 13 are caused to move towards each other also in this case, even though only one electrode is able to move in this fixed co-ordinate system.

The spot welding gun shown in FIG. 17 differs from that shown in FIGS. 1–2 by virtue of the gun including solely one plate 14 having two slots 16, 17 and disposed in a respective opening or aperture 71 in respective electrode arms 10, 11. Each electrode arm 10, 11 includes a hole in which a cylindrical shaft or pin 72 is disposed. Each of the cylindrical pins 72, which are conveniently fastened in respective electrode arms with the aid of bearings, such as roller bearings or ball bearings, are in engagement with a slot 16, 17 in the plate 14, in other words each pin 72 extends through a respective slot 16, 17 so as to obtain the same wedging effect as that earlier described as the rod 2 is driven forwards, so that the electrodes will be moved towards each other and press against the objects to be welded with the force required.

The benefit afforded by this embodiment is that only one plate is required, which can be readily clamped firmly in the front end of the rod 2.

Figure 8:
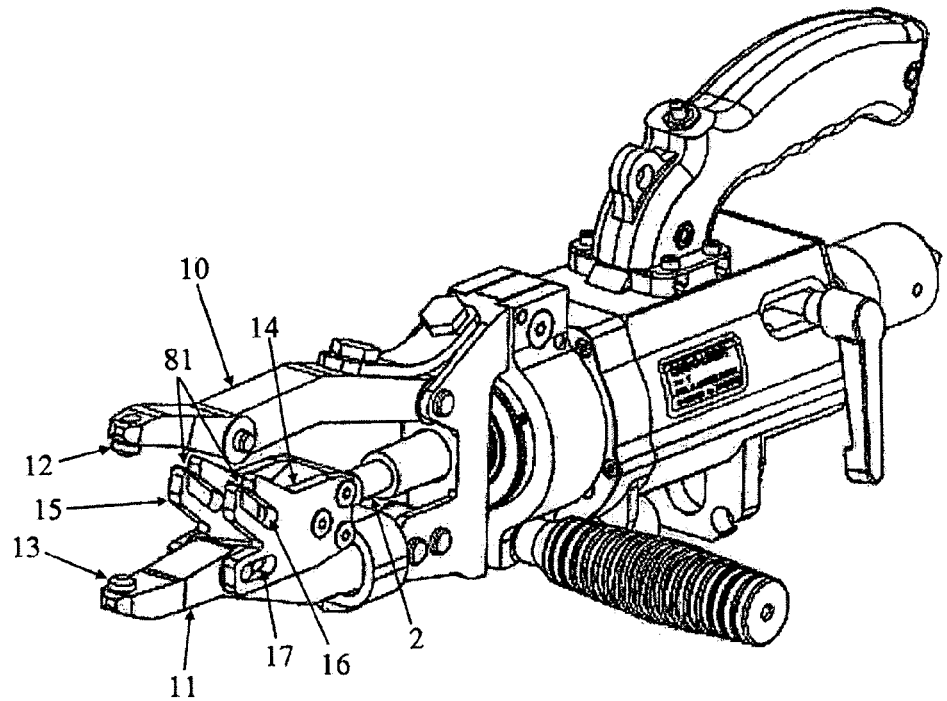

The spot welding gun shown in FIG. 8 differs from that shown in FIG. 6 solely by virtue of the upper slots 16 in the plates 14, 15 being open at one end, so as to enable the upper electrode arm 10 to pass completely free from the plates ? This free-passing possibility is extremely valuable when needing to pass different obstacles in order to reach the objects to be welded.

Figure 9:
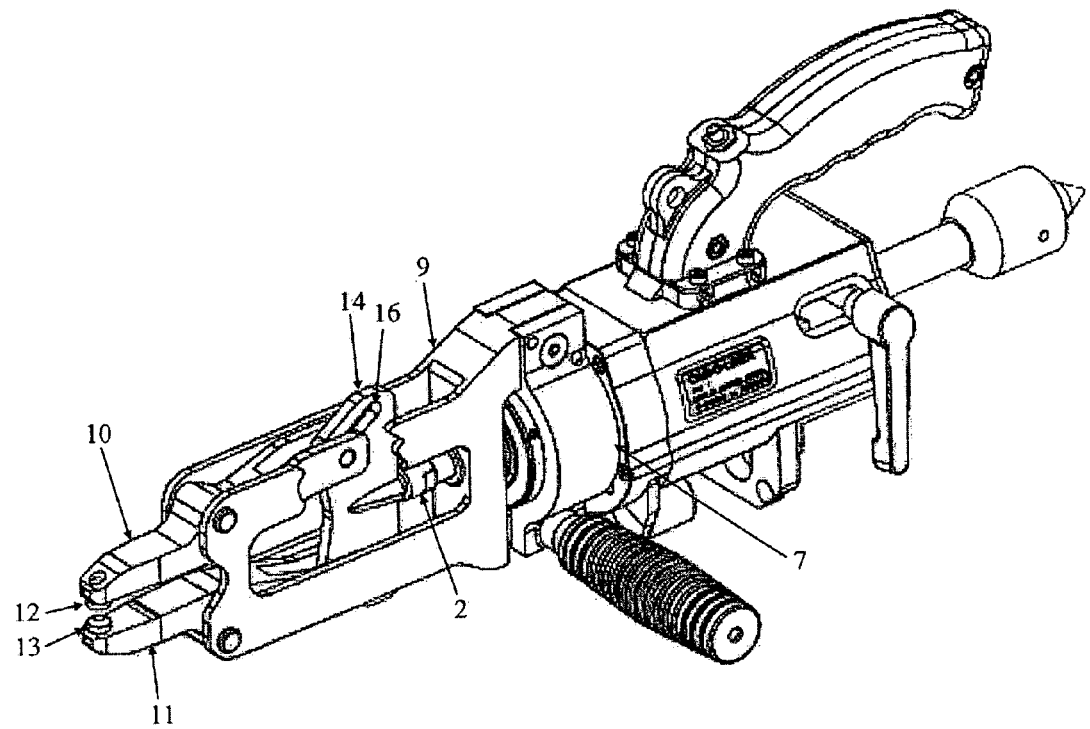

The spot welding gun shown in FIG. 9 differs from that shown in FIGS. 1–2 by virtue of the electrode arm attachment 9, which is firmly mounted in the ring-shaped part 7, extending further forwards. In addition, the gun includes only one plate 14 having two slots (only the upper slot 16 being visible in FIG. 9), which is firmly fastened to the rod 2 behind the pivot attachment of the arms 10, 11 in the plate 14.

The slots in the plate 14, which engage with corresponding pins on the rear parts of the electrode arms 10, 11, are angled in opposite directions with regard to the axial direction of the rod 2 as compared with the embodiment shown in FIGS. 1–2, so that the rear parts of the electrode arms will be pressed outwards by the wedging effect described earlier, as the rod 2 is driven forwards, wherewith the front parts of the electrode arms (carrying the electrodes 12, 13) are pressed inwards towards each other via the lever arms that are created when the electrode arms 10, 11 are pivotally mounted in the attachment 9 between the positions of the electrodes 12, 13 and the position of engagement between the pins on the electrode arms 10, 11 and the slots 16 and the plate 14.

It will be noted that part of the attachment 9 has been omitted in the FIG. 9 illustration, so as to illustrate the slot 16 and its engagement with a corresponding pin on the rear part of the electrode arm 10 more clearly.

Figure 10:
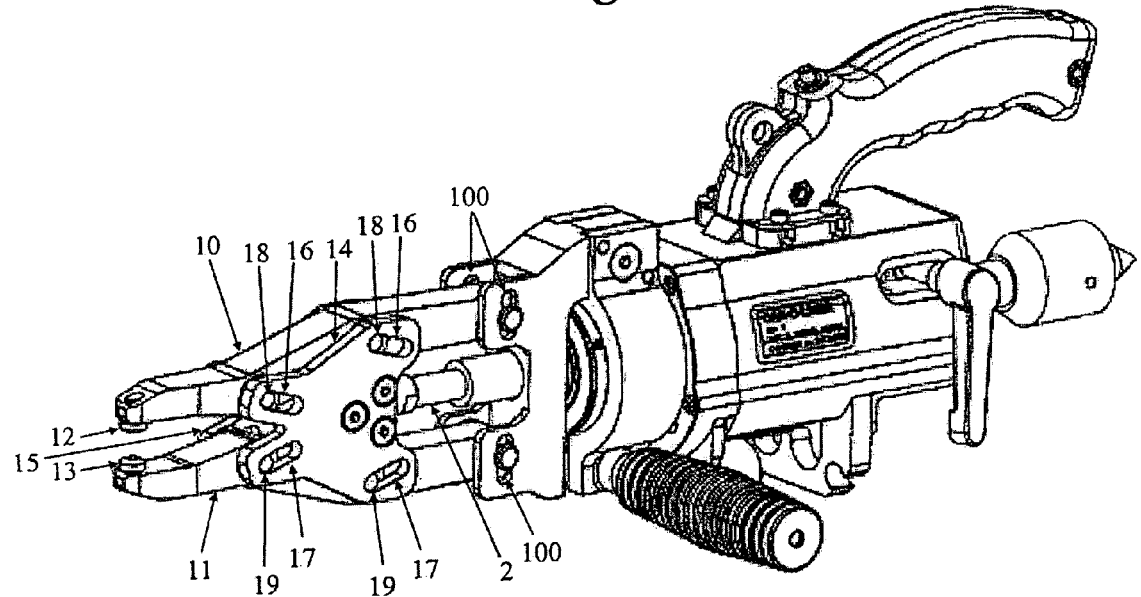

The spot welding gun shown in FIG. 10 differs from that shown in FIGS. 1–2 by virtue of each of the plates 14, 15 including two slots 16, 17 for each electrode arm 10, 11, where the slots 16, 17 for each electrode arm 10, 11 are preferably parallel with each other and located after one another in the longitudinal direction of the spot welding gun. Moreover, each electrode arm 10, 11 includes two projections or pins for each plate 14, 15 and for respective engagement with its slot 16, 17. Moreover, the rear end parts of the electrode arms 10, 11 are not only pivotally fastened in the attachment 9 but are also moveable vertically to a limited extent. The attachment 9 is provided to this end with vertically extending slots 100 with which pins or like projections on the rear end parts of the electrode arms 10, 11 engage. This embodiment ensures that as the rod 2 is driven forwards, the pins on the electrode arms 10, 11 will run in respective slots 16, 17, 100 so that the wedging action created in double slots will force the electrode arms 10, 11 to move linearly with respect to each other.

The embodiment illustrated in FIG. 10 is beneficial by virtue of the fact that the clamping forces will always be fully counter-directional (in the figure completely vertical) regardless of the thickness of the objects to be welded.

It will be realized that the present invention as described hitherto will solve the problems associated with know technology. It will be understood that the invention is not restricted to the described and illustrated embodiments thereof, and that modifications can be made within the scope of the accompanying claims.

It will also be understood that different elements of the various embodiments can be combined to obtain further embodiments.

It will be realized by the person skilled in this art that whereas each plate connected operatively to the rod 2 includes slots, grooves or a roller and that each electrode arm is provided with projections, one or more pins, or an oblique surface in the embodiments described above, the reverse is also applicable, i.e. that each plate operatively connected to the rod 2 may be provided with projections, pins, or oblique surfaces while each electrode arm is provided with one or more slots, grooves or a roller that engages with respective corresponding components on the plate or the plates.

One benefit afforded by the present invention is that the force on the electrodes (12, 13) can be controlled relatively simply in relation to the force applied via the pressure rod (2) of the cylinder device, for instance at a ratio of 1:1. The force on the electrodes can also readily be amplified or decreased in relation to the cylinder output force, depending on the chosen force source and the force desired on the electrodes.

It will also be understood that the electrode arms may have a geometric shape other than those shown in the figures. The electrode arms may conveniently be designed for each application, among other things in accordance with the appearance and position of the objects to be welded, and also in accordance with the compressive force required to effect welding of the objects.

What is claimed is:

1. A spot welding gun for resistance welding of objects, comprising
   a first arm provided with an electrode,
   a second arm provided with an electrode and
   a rod which is moveable in an axial direction, wherein said electrodes face one another,
   the axial direction of the rod is generally at right angles to the directions of said electrodes,
   at least one of the first and second arms is pivotally mounted, and
   the spot welding gun is adapted to press the objects to be welded together between said electrodes by axial movement of the rod, and allow welding current to flow between said electrodes, and wherein the spot welding gun further includes
   structural elements operatively connected to at least the pivotally mounted arm of said first and second arms and said rod, wherein the structural elements are in mutual engagement and one of the structural elements move translatively in the axial direction and forces another one of the structural elements to move translatively in a direction substantially orthogonally thereto to thereby force at least one of said electrodes towards the other of said electrodes as the rod moves axially, and said structural elements are disposed between the point at which said at least one of said first and second arms is pivotally mounted and said electrodes.

2. A spot welding gun according to claim 1, wherein the structural elements force at least one of said electrodes towards the other of said electrodes through the medium of a wedging effect as the rod moves axially.

3. A spot welding gun according to claim 1, wherein one of said structural elements comprises a slot, a groove or a roller and wherein another of said structural elements includes a projection adapted to run in said slot or said groove or on a surface adapted to guide said roller.

4. A spot welding gun according to claim 3, wherein said structural elements operatively connected to said rod include said slots, said grooves or said roller and wherein said structural elements operatively connected to said one of said first and second arms includes said projections or said surface.

5. A spot welding gun according to claim 3, wherein said slots are straight, wherein said grooves are straight, or wherein said surface is planar and extends in a direction that lies between the axial direction of the rod and the directions of one of said electrodes and that lies in the plane which is pitched in the axial direction of the rod and the directions of said electrodes.

6. A spot welding gun according to claim 3, wherein said slot, groove or surface is curved.

7. A spot welding gun according to claim 1, wherein a second of said first and second arms is pivotally mounted, and wherein said second arm of said first and second arms is operatively connected to a structural element that is in engagement with the structural element operatively connected to the rod, wherein the structural elements are in engagement with each other and move relative to one another translatively and force the other of said electrodes towards said one of said electrodes as the rod is moved axially.

8. A spot welding gun according to claim 1, wherein said first and said second arm and said structural elements and said rod can be rotated or pivoted as a unit in a plane whose normal coincides with the axial direction of the rod.

9. A spot welding gun according to claim 1, wherein said structural elements, which are in mutual engagement and move relative to one another in a translatory fashion, can be freed from one another.

10. A spot welding gun according to claim 1, wherein said at least one of said first and second arms that is pivotally mounted is also moveable translatively to a limited extent in the directions of said electrodes, and structural elements that are in mutual engagement and move relative to one another translatively function to force at least one of said electrodes towards the other of said electrodes in a linear movement as said rod is moved axially.

11. An accessory for a spot welding gun for resistance welding, wherein the accessory
is recoverably fitted to the welding gun and
includes a rod which is moveable in an axial direction, a first arm and a second arm provided with electrodes which face one another, and electrode electrical connections, wherein the axial direction of the rod is generally perpendicular to the directions of the electrodes when said device is fitted to the welding gun, at least one of said first and second arms is pivotally mounted, when fitted to the welding gun in use the accessory functions to move axially and therewith influencing the electrodes such as to comprise the objects to be welded, and said electrical connections are adapted to receive welding current, which is caused to flow between the electrodes, wherein said accessory further comprises structural elements which are connected operatively to at least one of said first and second arms that is pivotally mounted and said rod, wherein the structural elements are in mutual engagement and, one of the structural elements move translatively in the axial direction and forces another one of the structural elements to move translatively in a direction substantially orthogonally thereto to thereby force at least one of said electrodes towards the other of said electrodes as the rod moves axially, and said structural elements are disposed between the point at which at least one of said first and second arms is pivotally mounted and said electrodes.

12. A spot welding gun for resistance welding of objects, comprising a first arm provided with an electrode, a second arm provided with an electrode, a rod which is axially moveable, wherein said electrodes face each other, the axial direction of the rod is generally perpendicular to the directions of the electrodes, at least one of said first and second arms is pivotally mounted, and the spot welding gun is adapted to press together objects to be welded together located between said electrodes, by axial movement of the rod, and to permit welding current to flow between said electrodes, and wherein the welding gun further comprises structural elements which are connected operatively to at least said one of said first and second arms that is pivotally mounted, and said rod, wherein the structural elements are in mutual engagement, and one of the structural elements move translatively in the axial direction and forces another one of the structural elements to move translatively in a direction substantially orthogonally thereto to thereby force at least one of said electrodes towards the other of said electrodes as the rod moves axially, and the other of said first and second arms is pivotally mounted and said structural elements are also operatively connected to said other of said first and second arms and therewith force the other of said electrodes towards one of said electrodes as said rod moves axially.

* * * * *